(12) United States Patent
Rökman et al.

(10) Patent No.: US 7,578,938 B2
(45) Date of Patent: Aug. 25, 2009

(54) FILTERING MEDIUM AND USE OF THE SAID FILTERING MEDIUM FOR POLLUTION REMOVAL FROM LAGOONS

(75) Inventors: Kay Rökman, Karhula (FI); Hanna Rahiala, Karhula (FI); Pascale Escaffre, La Cote St Andre (FR); Valérie Chauve, Vienne (FR); Joseph Dussaud, Vienne (FR); Menno Dufour, Lyons (FR); Gilles Gauthier, Salaise sur Sanne (FR)

(73) Assignee: Ahlstrom Corporation, Helsinki (FI)

( * ) Notice: Subject to any disclaimer, the term of this patent is extended or adjusted under 35 U.S.C. 154(b) by 576 days.

(21) Appl. No.: 10/530,408

(22) PCT Filed: Oct. 9, 2003

(86) PCT No.: PCT/FI03/00748
§ 371 (c)(1),
(2), (4) Date: Jun. 1, 2005

(87) PCT Pub. No.: WO2004/033069
PCT Pub. Date: Apr. 22, 2004

(65) Prior Publication Data
US 2005/0211642 A1 Sep. 29, 2005

(30) Foreign Application Priority Data
Oct. 10, 2002 (FR) .................................. 02 12605

(51) Int. Cl.
*B01D 15/00* (2006.01)
(52) U.S. Cl. .................. 210/263; 210/671; 96/131; 96/135
(58) Field of Classification Search ............... 210/671, 210/263; 8/116.1, 120; 96/131, 135
See application file for complete search history.

(56) References Cited

U.S. PATENT DOCUMENTS

| | | | | |
|---|---|---|---|---|
| 2,582,388 A | * | 1/1952 | Mansfield | .................. 210/266 |
| 3,915,855 A | * | 10/1975 | Teng et al. | .................. 210/671 |
| 4,069,297 A | | 1/1978 | Saito et al. | |
| 4,107,426 A | | 8/1978 | Gordon | |
| 4,285,831 A | | 8/1981 | Yoshida et al. | |
| 6,342,268 B1 | | 1/2002 | Samain | |
| 2002/0119723 A1 | * | 8/2002 | Heinrich et al. | .............. 442/389 |
| 2002/0139742 A1 | | 10/2002 | Svirklys et al. | |

FOREIGN PATENT DOCUMENTS

| | | | |
|---|---|---|---|
| FR | 2 812 825 | 2/2002 | |
| JP | 54060384 A * | 5/1979 | ................. 536/63 |
| JP | 2000-024426 | 1/2000 | |
| WO | WO 99/08784 | 2/1999 | |
| WO | WO 02/13950 A1 | 2/2002 | |

OTHER PUBLICATIONS

Database WPI XP-002277671 & JP 58 138326, Aug. 17, 1983.
Database WPI XP-002251685 & JP 53 061582, Jun. 2, 1978.
Database WPI XP-002251686 & JP 53 061581, Jun. 2, 1978.
Database WPI XP-002251687 & JP 50 011352, Apr. 30, 1975.
Patent Abstracts of Japan, vol. 2000, No. 12, Jan. 3, 2001 & JP 2000-263678 A, Sep. 26, 2000.
Patent Abstracts of Japan, vol. 1999, No. 12, Oct. 29, 1999 & JP 11 192428 A, Jul. 21, 1999.
International Search Report Jun. 1, 2004.

* cited by examiner

*Primary Examiner*—Robert A Hopkins
(74) *Attorney, Agent, or Firm*—Nixon & Vanderhye P.C.

(57) ABSTRACT

Filtering medium based on activated carbon which is characterized in that it comprises three superposed layers, respectively an inner layer and two outer layers, the inner layer consisting of 80 to 95% by dry weight of activated carbon, the balance for 100% consisting of organic and/or inorganic chemical fibres, the first outer layer comprising from 45 to 95% by dry weight of organic and/or inorganic chemical fibres, the balance for 100% consisting of activated carbon and/or of a material having a density of less than 0.9, the second outer layer comprising from 5 to 25% by dry weight of activated carbon, the balance for 100% consisting of organic and/or inorganic chemical fibres, and in that the weight of the inner layer is between 40 and 200 g/m2 and the weight of the outer layers is between 10 and 100 g/m2.

14 Claims, No Drawings

FILTERING MEDIUM AND USE OF THE SAID FILTERING MEDIUM FOR POLLUTION REMOVAL FROM LAGOONS

This application is the US national phase of international application PCT/FI2003/000748 filed 9 Oct. 2003 which designated the U.S. and claims benefit of FR 02/12605, dated 10 Oct. 2002, the entire content of which is hereby incorporated by reference.

The invention first of all relates to a support based on cellulose fibres capable of floating for longer at the surface of a liquid and in particular of water. Its subject is also an improved filtering medium incorporating the said support. It also relates to the use of the said medium, in particular for pollution removal from lagoons.

Lagooning is one of the biological treatments of waste water currently proposed. This process is advantageous in that it does not require the supply of external energy and produces a quantity of stabilized sludge which is less than for conventional processes (such as for example activated sludge, bacteria beds, and the like). In addition, the removal of pathogenic microorganisms is more effective, which constitutes an important parameter for the reuse of waste water.

The lagooning purification systems generally comprise several basins in series, of which the most common are called anaerobic lagoon, facultative lagoon and maturation lagoon. These lagoons have specific functions and are characterized by very different purification ecosystems. Their operation results from their characteristics, mainly from the geometry (essentially the depth), the organic load received and the residence time of the waste water.

In practice, the treatment requires three basins in series, respectively a primary facultative lagoon and two maturation lagoons, often preceded, at the beginning of the network, by an anaerobic lagoon. This treatment network, called natural lagooning, does not require energy, in contrast to the so-called "aerated" lagooning treatment consisting of several basins of which the first is equipped with an artificial aeration device providing the majority of the oxygen requirements. The waste water of the anaerobic lagoon can then be poured and mixed in basins, which are this time aerobic, providing additional removal of the organic pollution. This waste water is particularly rich in zooplankton, phytoplankton and protozoa providing food for fish and crustaceans.

Anaerobic lagoons, like aerobic lagoons, have certain disadvantages.

Anaerobic lagoons are very satisfactory from the point of view of purification performance (70% removal of organic matter) since anaerobic digestion by bacteria makes it possible to avoid the accumulation of sludge. In practice, the sludge is digested by the bacteria which produce a number of gases, including $CH_4$, nitrogen, $CO_2$ and $H_2S$. Although these lagoons are quite satisfactory from the point of view of purification performance, on the other hand, they are responsible for considerable olfactory nuisance, due in particular to the emission of $H_2S$ which is produced by sulphate-reducing bacteria. Several solutions for reducing the emission of foul-smelling compounds have been proposed.

The first method consists in adding to the lagoon water $FeCl_3$ so as to precipitate the sulphides in the form of insoluble iron sulphides ($FeS$ or $FeS_2$). However, the risk of toxicity is high. A second technique, called "liming", consists in increasing the pH of the lagoon in order to reduce the proportion of $H_2S$. This technique remains relatively efficient but is toxic if the pH exceeds 8.5. It has also been proposed to aerate the surface of the lagoon by forming an oxidizing layer at the surface for the oxidation of sulphides to sulphates. This solution is relatively inefficient and is not very powerful. Another approach consists in recirculating a secondary effluent having a high pH as well as an algal biomass capable of making the medium oxidizing by means of photosynthesis, the effluent flow rate being higher in order to renew the water and to dilute the sulphides. This technique is efficient and not very costly, but still remains little documented as regards the long-term impact on the purification performance. Another particularly expensive solution consists in covering the lagoon with an impermeable cover so as to isolate the emission of odorous gases and to collect and then treat the biogas produced.

A final principle of treatment known to the applicant consists in covering the surface of the lagoon with a biological permeable cover consisting of a bed planted with peat, floating at the surface of the lagoon. While this device leads to the reduction of the emission of $H_2S$ in a particularly efficient manner, on the other hand, its large-scale application remains difficult to envisage because it is linked in particular to the problem of floatation.

As regards aerobic lagoons, they are also thought to be efficient for the removal of the organic pollution remaining in the waste water treated in anaerobic lagoons, if they do not allow the development of algae, blocking photosynthesis. No solution has apparently yet been proposed for solving this problem.

The applicant is specialized in the development of novel paper or more widely of novel supports based on cellulose fibres.

In document FR-A-2 812 825, for example, the applicant describes a filtering medium based on a photocatalytic agent and activated charcoal used for the purification of gaseous or liquid effluents in general, with no reference to any field. More precisely, this medium results from the combination of three components; respectively a permeable support based in particular on natural and/or cellulose fibres, a first layer based on activated charcoal and a second separate layer, based on a photocatalytic agent.

The applicant's idea would be to use this type of medium for the removal of pollution from anaerobic lagoons. Unfortunately, this medium is incapable of floating alone and for long at the surface of water. Moreover, the activated charcoal-based layer consists of a mixture comprising at most 75% by weight of activated carbon fibres, the balance for 100% consisting of a mixture based on organic chemical fibres and/or natural fibres. As this document recalls, it is in addition known that the activated carbon fibres or particles, whose production processes are more particularly described in the documents U.S. Pat. No. 4,069,297 and U.S. Pat. No. 4,285, 831 exhibit no capacity for binding to each other (in particular because of their size, in practice between 2 and 7 mm), for which reason it is necessary to link them by means of chemical organic fibres and/or natural fibres.

However, for the treatment of anaerobic lagoons, it would be necessary to have available the largest possible quantity of activated carbon because of the high content of gas emitted by anaerobic bacteria. To solve this problem, it would be possible to envisage increasing the proportion of activated carbon fibres in the intermediate layer described in the document FR-A-2 812 825 by the applicant. However, one would be inexorably confronted with problems of cohesion of the activated carbon fibres, which would confer a very low mechanical resistance on the support.

In other words, the first problem the applicant had to solve was to develop a support based on natural and/or cellulose fibres which are capable of floating for long at the surface of a liquid, in particular of water.

Another problem which the invention proposes to solve and which relates more particularly to the treatment of aerobic lagoons is to develop a medium which prevents the proliferation of algae.

The applicant has observed, quite surprisingly, that a support based on cellulosic and/or natural fibres, treated with a grafting reagent RX, of the fatty acid halide type, for example according to the teachings of the document WO 99/08784, exhibited lasting floatability properties. In particular, the applicant observed that such a support was capable of floating for several weeks, while being capable of supporting at least 6 times its weight.

In other words, the applicant's invention is to use, as floating support a support based on cellulose and/or natural fibres, of which all or some of the OH functional groups have reacted with a grafting reagent RX, where R is a suitable hydrophobic group in order to be able to be in the liquid state at a temperature of at least 200° C. at atmospheric pressure and in order to be able to react on the OH functional groups at least under certain reaction conditions, while producing covalent grafting of hydrophobic groups R onto the OH functional groups with formation of a volatile compound HX under the reaction conditions.

In the remainder of the description and in the claims, the expression "hydrophobic group R" denotes an organic group comprising more than 6 carbon atoms, advantageously between 8 and 50 carbon atoms.

In an advantageous embodiment, RX is a fatty acid halide.

This type of treatment is particularly well described in the abovementioned document WO 99/08784. Essentially, it consists in applying a liquid composition containing the grafting reagent RX onto one or both sides of the support, and then in causing a gaseous steam to pass over the support thus treated, at a temperature of less than the boiling temperature of the grafting reagent.

Advantageously, the fatty acid halide is a saturated or unsaturated aliphatic acid halide comprising at least 16 carbon atoms, advantageously behenic acid.

As already stated, by virtue of its floatability properties, the support can serve as basic component for a more complex medium, capable of being used for removing pollution from lagoons.

In particular, the applicant has developed a support which is more specifically suited to the treatment of aerobic lagoons.

Thus, also a medium is discussed, in particular for the treatment of aerobic lagoons, provided in the form of a support based on cellulosic and/or natural fibres, of which all or some of the OH functional groups have reacted with a grafting reagent RX mentioned above, the medium additionally containing carbon black.

Advantageously the support additionally contains epichlorohydrin resin.

Preferably, the support contains as dry parts:
between 90 and 98% of north resinous fibres, advantageously 95%
between 1 and 4% of carbon black, advantageously 3%
between 1 and 3% of epichlorohydrin resin, advantageously 2%.

In practice, the carbon black and the resin are incorporated into the mass at the time of manufacturing the sheet. It is only afterwards that the treatment with the grafting reagent, in particular an unsaturated or saturated aliphatic fatty acid halide, advantageously containing at least 16 carbon atoms, is carried out. In an advantageous embodiment, the corresponding fatty acid is stearic acid and/or behenic acid.

The problem of floatability having been resolved, the applicant then sought to solve two further problems. A problem which the present invention proposes to solve is to develop a filtering medium particularly suitable for the treatment of anaerobic lagoons which contains a high content of activated carbon fibres or powder while being endowed with increased mechanical resistance.

To do this, the invention proposes a filtering medium based on activated carbon which is characterized in that it comprises three superposed layers, respectively an inner layer and two top and bottom outer layers,
the inner layer consisting of 80 to 95% by dry weight of activated carbon, the balance for 100% consisting of organic and/or inorganic chemical fibres,
the bottom layer comprising from 45 to 100% by dry weight of organic chemical fibres having OH functional groups and optionally inorganic fibres, the possible balance for 100% consisting, where appropriate, of activated carbon and/or of a material having a density below 0.9, all or some of the OH functional groups of the organic chemical fibres having reacted with the abovementioned grafting reagent RX to form a covalent bond after releasing the compound HX,
the top layer comprising from 5 to 25% by dry weight of activated carbon, the balance for 100% consisting of organic and/or inorganic chemical fibres.

Likewise as above, RX is a fatty acid halide, in particular a saturated or unsaturated aliphatic acid halide comprising at least 16 carbon atoms, advantageously behenic acid.

According to another characteristic, the weight of the inner layer is between 40 and 200 g/m² and the weight of the outer layers is between 10 and 100 g/m².

In the remainder of the description and in the claims, the expression "activated carbon" denotes activated carbon in the form of fibres or of a powder having a particle size of between 2 and 300 μm, alone or as a mixture.

In the remainder of the description and in the claims, the expression "organic and/or inorganic fibres" denotes, among the organic fibres, with the exception of activated carbon fibres, in particular cellulose fibres, synthetic fibres for example of the polyester or polyethylene, polypropylene, polyamide, polyvinyl chloride, polyvinyl alcohol, acrylic or nylon type; artificial fibres (for example viscose, cellulose acetate); natural fibres (for example cotton, wool, wood pulp), and among the inorganic fibres, in particular mineral fibres (for example glass, ceramic). The organic fibres having OH functional groups present in the bottom layer of the invention are more specifically cellulose fibres and/or natural fibres. Of course, all the organic fibres contained in the bottom layer do not necessarily have OH functional groups.

In other words, the invention consists in providing cohesion of the activated carbon by putting it in a sandwich between two layers, of which at least one is based on activated carbon in the form of fibres or powder, which thus makes it possible to considerably increase the quantity of activated carbon, and therefore the gas adsorption capacity, while conferring increased mechanical resistance on the medium. In addition, the treatment of the bottom layer by means of a fatty acid halide as described above makes it possible to confer floatability properties on the medium.

In practice, the bottom layer contains at least 30% by weight of organic fibres having OH functional groups. Below this value, the medium floats over a shorter period.

Advantageously, the activated carbon contained in the top layer and, where appropriate, the bottom layer is in the form of fibres.

In a particular embodiment, the lower layer contains a material having a density of less than 0.9, thus conferring on the filtering medium an additional property of floatation.

According to the invention, the density of the material should be less than 0.9, regardless of the conditions, in dry or liquid medium. Thus, there may be used as material of this type, cork, expanded polystyrene, encapsulated air or any equivalent material. In practice, such material is used in the layer in proportions of 5 to 20% by weight with or in the absence of activated carbon. Of course, the presence of the latter strengthens the capacity of the medium to fix a larger quantity of gas.

As already stated, the activated carbon fibres are more particularly described in the documents U.S. Pat. No. 4,069,297 and U.S. Pat. No. 4,285,831. In addition, it is known that carbon fibres may be treated in order to obtain variable specific surface areas depending on their application. In particular, when adsorbing gases, the specific surface area of the fibre may vary from one gas to another.

Consequently and according to a first embodiment, the filtering medium contains activated carbon in the form of fibres intended to adsorb $CH_4$ and $H_2S$, whose characteristics are the following:

yarn count of the filament 1 to 1.5 dtex,
specific surface area: 1 400 $m^2/g$,
amount of microporosity: 95%.

In a second embodiment, the filtering medium also contains activated carbon in the form of fibres intended to adsorb the $NH_3$ and/or the other pollutants. In practice, these fibres ($H_2S/NH_3$) are used in proportions of between 20/80 and 80/20, in practice 50/50.

To allow continuous desaturation of the active sites of the carbon, and therefore the infinite regeneration of the said activated carbon, the upper layer of the medium systematically containing activated carbon is coated with a layer based on a photocatalytic agent. As photocatalytic agent, there may be used titanium dioxide $TiO_2$ anatase, but also other agents such as those forming in particular part of the group of metal oxides, alkaline-earth metal oxides, actinide oxides and rare earth oxides.

In an embodiment as described in the document WO 99/51345 by the applicant, the layer based on photocatalytic agent exists in the form of a mixture comprising between 10 and 70 parts, advantageously 50 parts of an aqueous colloidal dispersion of silicon dioxide ($SiO_2$), the balance for 100 parts consisting of $TiO_2$ anatase.

Moreover, to allow effective binding of the $TiO_2$ particles not only to one another, but also to the outer layer based on activated carbon, the particles of $SiO_2$ represent from 1 to 50% by weight of the colloidal aqueous dispersion and have a diameter of between 10 and 40 nm.

Likewise, for the photocatalytic reaction to be effective and for the desorption of the activated charcoal contained in the outer layer and in the central layer to occur uniformly, the layer based on photocatalytic agent comprises between 5 and 40 $g/m^2$, advantageously 20 $g/m^2$ of photocatalytic agent. For a value of less than 5 $g/m^2$, the photocatalytic reaction is reduced given the excessively small thickness of the layer. By contrast, for a value greater than 40 $g/m^2$, the mass of photocatalytic agent becomes too high, preventing the UV rays from reaching the particles of photocatalytic agent present at the base of the layer.

The invention also relates to a process for manufacturing the filtering medium based on activated carbon.

According to this process, the top layer is prepared, the inner layer is then applied to the top layer, and then the bottom layer is applied to the inner layer.

The three layers are manufactured by the wet route continuously on a paper-making machine by providing three headboxes intended for the preparation of fibrous suspensions, a first headbox for the top layer, a second headbox for the inner layer, a third headbox for the bottom layer, the three layers being integrally connected by draining and then drying. To confer the floatability character on the medium, the free surface of the bottom layer of the medium is reacted with the grafting reagent RX under conditions which make it possible to create bonds between the OH functional groups of the organic fibres and the fatty acid, after releasing the volatile compound HX.

In the embodiment according to which the bottom layer contains a material having a density of less than 0.9, the first headbox contains a mixture of the said material, of foam and of organic and/or inorganic fibres.

When the support is coated with a photocatalytic composition, the layer is applied by spraying or coating by a size press or by a perforated applying roller (Ducheneau or Storck).

A subject of the invention is also a filtering medium based on activated carbon which is characterized in that it comprises three superposed layers, respectively an inner layer and two outer layers, the inner layer consisting of 80 to 95% by dry weight of activated carbon, the balance for 100% consisting of organic and/or inorganic chemical fibres, the first outer layer comprising from 45 to 95% by dry weight of organic and/or inorganic chemical fibres, the balance for 100% consisting of activated carbon and/or of a material having a density of less than 0.9, the second outer layer comprising from 5 to 25% by dry weight of activated carbon, the balance for 100% consisting of organic and/or inorganic chemical fibres, and in that the weight of the inner layer is between 40 and 200 $g/m^2$ and the weight of the outer layers is between 10 and 100 $g/m^2$.

In a first embodiment, the second outer layer contains from 5 to 25% by dry weight of activated carbon, advantageously in the form of fibres, the balance for 100% consisting of organic and/or inorganic chemical fibres.

Advantageously, the outer layers have the same compositions.

For example, the inner layer contains 90% by dry weight of activated carbon, advantageously in the form of fibres, 10% by dry weight of organic and/or inorganic chemical fibres and has a weight of 70 $g/m^2$ while the outer layers contain 10% by dry weight of activated carbon, advantageously in the form of fibres and have a weight equal to 30 $g/m^2$.

The filtering medium is advantageously used as a floating support, and as already mentioned, the supports as described may be advantageously used for removal of pollution from anaerobic or aerobic lagoons.

The invention and the advantages derived therefrom will emerge more clearly from the following exemplary embodiment.

On a paper machine having three headboxes, there is produced by the wet route a fibrous sheet having a mass equal to 40 $g/m^2$ consisting of 10% activated carbon fibres marketed by BLUCHER having a specific surface area equal to 1 500 $m^2/g$ and selective for $CH_4$ and $H_2S$ adsorption, whose length is between 2 and 7 mm and whose diameter is between 15 and 100 µm, and of 45% by weight of Dacron® organic chemical fibres marketed by DUPONT S.A., that is 18 $g/m^2$, and 45% by weight of N720 polyvinyl alcohol fibres marketed by KURARAY, that is 18 $g/m^2$ on a dry basis.

To this first support, there is applied, by means of the second headbox, a fibrous sheet having a mass equal to 70 $g/m^2$, consisting of 90% by weight of activated carbon fibres of the same type as those mentioned above, and 10% by weight of organic chemical fibres.

To this second layer, there is applied, by means of the third headbox, a fibrous sheet whose composition and mass are identical to those of the first layer except that the DACRON® fibres are replaced with cellulose fibres.

There is then applied by spray-coating a photocatalytic composition consisting of a mixture of $TiO_2$ (marketed by MILLENIUM) and an aqueous dispersion of silicon dioxide (SNOWTEX marketed by SEPPIC) in an amount of 30 g/m², the proportion of $TiO_2$ and of silicon dioxide being 50/50.

The bottom layer is finally treated by microdispersion, in a gaseous stream of stearic acid chloride.

The pollution removal tests are carried out on cylindrical columns 150 mm in diameter and 1.20 m in height containing:
- A/ 50 cm of sludge consisting of a mixture of 50% fresh sludge (rich in organic matter and with limited bacterial activity) and 50% of digested sludge of lagoonal origin (with a high methagenic activity)
- B/ 75 cm of waste water in equal parts of system waste water and purification primary lagoon water
- C/ filtering medium as described above for one of the columns, the other column being free of filtering medium and constituting the control column.

The duration of the test is 3 months and the water level is adjusted 3 times per week.

The measurements of gas production on the control column are:
  49 l/m² and per day and composed of $CH_4$ (83%) $N_2$ (14%) $CO_2$ (<4%) and $H_2S$ (<1%), that is about 60 mg S/m².d (0.6 ppm of $H_2S$ atm)

On the test column containing the filtering medium, the following were measured:
  $CO_2$: 96%
  $N_2$: 4%

An odour panel did not identify a nauseating odour traditionally detected with $H_2S$ (olfactory threshold for $H_2S$ detected by the human nose: 3 ppb).

The invention and the advantages resulting therefrom emerge clearly from the preceding description. It will be noted in particular the high capacity of the medium of the invention to adsorb and then destroy pollutants by virtue of the presence of activated carbon in very high proportions, this being while retaining optimum cohesion of the medium.

The invention claimed is:

1. Filtering medium based on activated carbon comprising three superposed layers which include top and bottom outer layers and an inner layer between said outer layers, wherein
   the inner layer consists of 80 to 90% by dry weight of activated carbon, the balance to 100% consisting of organic and/or inorganic chemical fibres; and wherein
   the bottom layer comprising from 45 to 100% by dry weight of organic chemical fibres having OH functional groups and optionally inorganic fibres, the possible balance to 100% consisting of activated carbon and/or a material having a density below 0.9, wherein all or some of the OH functional groups have reacted with a grafting reagent RX, where R is a suitable hydrophobic group in order to be able to be in the liquid state at a temperature of at least 200° C. at atmospheric pressure and in order to be able to react on the OH functional groups at least under certain reaction conditions, while producing covalent grafting of hydrophobic groups R onto the OH functional groups with formation of a volatile compound HX under the reaction conditions, and wherein
   the top layer comprises from 5 to 25% by dry weight of activated carbon, the balance to 100% consisting of organic and/or inorganic chemical fibres.

2. Filtering medium according to claim 1, wherein RX is a saturated or unsaturated fatty acid halide comprising at least 16 carbon atoms.

3. Filtering medium according to claim 2, wherein RX is behenic acid.

4. Filtering medium according to claim 1, wherein the activated carbon present in the top layer and optionally in the bottom layer is in the form of fibres.

5. Filtering medium according to claim 1, wherein the activated carbon in the top layer and optionally in the bottom layer is in the form of fibres for adsorbing $CH_4$ and $H_2S$, wherein the activated carbon fibres exhibit the following characteristics:
   a yarn count of filaments of 1 to 1.5 dtex,
   a specific surface area of 1400 m²/mg, and
   microporosity in an amount of 95%.

6. Filtering medium according to claim 1, wherein the top layer includes a coating layer comprised of a photocatalytic agent.

7. Filtering medium according to claim 6, wherein the coating layer is a mixture comprising between 10 and 70 parts of an aqueous colloidal dispersion of silicon dioxide ($SiO_2$) particles, and the balance to 100 parts consisting of $TiO_2$ anatase.

8. Filtering medium according to claim 7, wherein the mixture comprises 50 parts of the aqueous colloidal dispersion of silicon dioxide ($SiO_2$).

9. Filtering medium according to claim 7, wherein the $SiO_2$ particles present in an amount from 1 to 50% by weight of the colloidal aqueous dispersion and have a diameter of between 10 and 40 nm.

10. Filtering medium according to claim 7, wherein the coating layer comprises between 5 and 40 g/m² of the photocatalytic agent.

11. Filtering medium according to claim 7, wherein the coating layer comprises 20 g/m² of the photocatalytic agent.

12. Filtering medium based on activated carbon which comprises three superposed layers including first and second outer layers and an inner layer between the outer layers, wherein the inner layer consists of 80 to 95% by dry weight of activated carbon, the balance to 100% consisting of organic and/or inorganic chemical fibres, and wherein the first outer layer comprises from 45 to 95% by dry weight of an organic and/or inorganic chemical, the balance to 100% consisting of activated carbon and/or of a material having a density of less than 0.9, and wherein the second outer layer comprises from 5 to 25% by dry weight of activated carbon, the balance to 100% consisting of organic and/or inorganic chemical fibres, and wherein the inner layer has a weight of between 40 and 200 g/m², and the outer layers have a weight between 10 and 100 g/m².

13. A floating support which comprises the filtering medium of claim 1 or 12.

14. Filtering medium as in claim 1 or 12, which further comprises epichlorohydrin resin in at least one of the top, inner and bottom layers.

* * * * *